(12) United States Patent
Dumont et al.

(10) Patent No.: US 10,739,253 B2
(45) Date of Patent: Aug. 11, 2020

(54) METHODS, SYSTEMS, AND DEVICES FOR CALIBRATING LIGHT SENSING DEVICES

(71) Applicant: YouV Labs, Inc., New York, NY (US)

(72) Inventors: Emmanuel Dumont, New York, NY (US); Shayak Banerjee, Hartsdale, NY (US)

(73) Assignee: YouV Labs, Inc., New York, NY (US)

( * ) Notice: Subject to any disclaimer, the term of this patent is extended or adjusted under 35 U.S.C. 154(b) by 0 days.

(21) Appl. No.: 15/616,814

(22) Filed: Jun. 7, 2017

(65) Prior Publication Data

US 2017/0350815 A1   Dec. 7, 2017

Related U.S. Application Data

(60) Provisional application No. 62/346,987, filed on Jun. 7, 2016.

(51) Int. Cl.

| | | |
|---|---|---|
| *G01N 21/27* | (2006.01) | |
| *G01N 21/93* | (2006.01) | |
| *G01D 18/00* | (2006.01) | |
| *G01J 1/42* | (2006.01) | |
| *G01J 1/02* | (2006.01) | |
| *G01N 21/01* | (2006.01) | |

(52) U.S. Cl.
CPC ......... *G01N 21/274* (2013.01); *G01D 18/008* (2013.01); *G01J 1/0219* (2013.01); *G01J 1/0295* (2013.01); *G01J 1/4204* (2013.01); *G01J 1/429* (2013.01); *G01N 21/93* (2013.01); *G01N 2021/0125* (2013.01); *G01N 2021/0181* (2013.01)

(58) Field of Classification Search
CPC ............... G01N 21/274; G01N 21/93; G01N 2021/0125; G01N 2021/0181; G01D 18/008; G01J 1/0219; G01J 1/0295; G01J 1/4204; G01J 1/429
See application file for complete search history.

(56) References Cited

U.S. PATENT DOCUMENTS

| | | |
|---|---|---|
| 376,547 A | 1/1888 | Pratt |
| 2,949,880 A | 8/1960 | Stephen |
| 3,268,839 A | 8/1966 | McFarland |
| 3,878,496 A | 4/1975 | Erickson |
| 4,229,733 A | 10/1980 | Tulenko et al. |

(Continued)

FOREIGN PATENT DOCUMENTS

| | | |
|---|---|---|
| JP | 2011-221010 A | 11/2011 |
| WO | WO01/52736 A1 | 7/2001 |

(Continued)

OTHER PUBLICATIONS amazon.com; UV meter (search results); 5 pgs.; retrieved from the internet (https://www.amazon.com/s/ref=nb_sb_noss_1?url=search-alias%3Daps&field-keywords=uv+meter) on Dec. 9, 2014.

(Continued)

*Primary Examiner* — Christine S. Kim
(74) *Attorney, Agent, or Firm* — Shay Glenn LLP (57) ABSTRACT

Systems, devices and methods for calibrating or increasing the accuracy of light sensing devices. The methods can include calibrating a light sensing device with a calibration source that is adapted to mimic at least one representative spectrum.

8 Claims, 6 Drawing Sheets

(56) References Cited

U.S. PATENT DOCUMENTS

| | | | |
|---|---|---|---|
| 4,255,665 | A | 3/1981 | Shriner |
| 4,348,664 | A | 9/1982 | Boschetti et al. |
| 4,428,050 | A | 1/1984 | Pellegrino et al. |
| 4,726,688 | A | 2/1988 | Ruel |
| 4,851,686 | A | 7/1989 | Pearson |
| 5,008,548 | A | 4/1991 | Gat |
| 5,036,311 | A | 7/1991 | Moran et al. |
| 5,148,023 | A | 9/1992 | Hayashi et al. |
| 5,151,600 | A | 9/1992 | Black |
| 5,204,532 | A | 4/1993 | Rosenthal |
| 5,365,068 | A | 11/1994 | Dickerson |
| 5,382,799 | A | 1/1995 | May |
| 5,497,004 | A | 3/1996 | Rudolph et al. |
| 5,500,532 | A | 3/1996 | Kozicki |
| 5,731,589 | A | 3/1998 | Sief et al. |
| 5,777,733 | A * | 7/1998 | Radziuk ............... G01J 3/2803 356/328 |
| 5,992,996 | A | 11/1999 | Sawyer |
| 6,201,250 | B1 | 3/2001 | Morlock |
| 6,322,503 | B1 | 11/2001 | Sparhawk |
| 6,426,503 | B1 | 7/2002 | Wüest |
| 6,437,346 | B1 | 8/2002 | Goudjil |
| 6,439,763 | B2 | 8/2002 | Roeder et al. |
| 6,582,380 | B2 | 6/2003 | Kazlausky et al. |
| D479,805 | S | 9/2003 | Tsai |
| 6,729,756 | B2 | 5/2004 | Sezai |
| 6,967,447 | B2 | 11/2005 | Lim et al. |
| 7,148,489 | B2 | 12/2006 | Yagi |
| 7,227,153 | B2 | 6/2007 | Yagi |
| 7,230,222 | B2 | 6/2007 | Cheng et al. |
| 7,265,358 | B2 | 9/2007 | Fontaine |
| 7,500,746 | B1 | 3/2009 | Howell et al. |
| 7,635,906 | B2 | 12/2009 | Nakamura et al. |
| 7,709,812 | B2 | 5/2010 | Simon et al. |
| 7,874,666 | B2 | 1/2011 | Xu et al. |
| 8,044,363 | B2 | 10/2011 | Ales et al. |
| 8,109,629 | B2 | 2/2012 | Howell et al. |
| 8,157,730 | B2 | 4/2012 | LeBoeuf et al. |
| 8,434,863 | B2 | 5/2013 | Howell et al. |
| 8,487,267 | B2 | 7/2013 | Abe et al. |
| 8,558,155 | B2 | 10/2013 | Tomlinson et al. |
| 8,586,938 | B2 | 11/2013 | Tsubata et al. |
| 8,605,802 | B2 | 12/2013 | Lee et al. |
| 8,829,457 | B2 | 9/2014 | Smith et al. |
| 9,068,887 | B1 | 6/2015 | Bennouri et al. |
| 9,360,364 | B2 | 6/2016 | Hingorani et al. |
| 9,368,537 | B1 | 6/2016 | Holmes et al. |
| 10,113,903 | B1 * | 10/2018 | Patil ............... G01J 1/0295 |
| 2003/0150998 | A1 | 8/2003 | Shin et al. |
| 2004/0108448 | A1 * | 6/2004 | Bosser ............... G01J 1/429 250/252.1 |
| 2004/0149921 | A1 | 8/2004 | Smyk |
| 2004/0225530 | A1 | 11/2004 | Bell et al. |
| 2005/0167580 | A1 * | 8/2005 | Scott ............... G01N 17/002 250/252.1 |
| 2005/0190655 | A1 | 9/2005 | Blumberg |
| 2005/0226446 | A1 | 10/2005 | Luo et al. |
| 2006/0289779 | A1 | 12/2006 | Marmaropoulos |
| 2007/0073487 | A1 | 3/2007 | Albright et al. |
| 2007/0170366 | A1 | 7/2007 | Lin et al. |
| 2008/0103561 | A1 | 5/2008 | Moscovici |
| 2008/0217611 | A1 | 9/2008 | Nakamura et al. |
| 2008/0266563 | A1 * | 10/2008 | Redman ............... G01J 3/02 356/406 |
| 2009/0090865 | A1 | 4/2009 | Lub et al. |
| 2009/0296533 | A1 | 12/2009 | Kojima |
| 2010/0163750 | A1 | 7/2010 | Hunwick, III et al. |
| 2010/0308105 | A1 | 12/2010 | Savarese et al. |
| 2011/0133103 | A1 | 6/2011 | Folkesson |
| 2011/0190595 | A1 | 8/2011 | Bennett et al. |
| 2011/0191272 | A1 | 8/2011 | McGuire |
| 2012/0115512 | A1 | 5/2012 | Grainger et al. |
| 2012/0241618 | A1 | 9/2012 | Hsu et al. |
| 2012/0326046 | A1 | 12/2012 | Aslam et al. |
| 2013/0020477 | A1 | 1/2013 | Castellan et al. |
| 2013/0093322 | A1 * | 4/2013 | Borsuk ............... H05B 41/2806 315/39.51 |
| 2013/0096466 | A1 | 4/2013 | Sarrafzadeh et al. |
| 2014/0032165 | A1 | 1/2014 | Sarrafzadeh et al. |
| 2014/0092238 | A1 | 4/2014 | Sandhu et al. |
| 2014/0145860 | A1 | 5/2014 | Park et al. |
| 2014/0296658 | A1 | 10/2014 | Yuen et al. |
| 2014/0374600 | A1 | 12/2014 | Gokingco et al. |
| 2015/0041663 | A1 | 2/2015 | Oliver et al. |
| 2015/0102208 | A1 | 4/2015 | Appelboom et al. |
| 2015/0136975 | A1 | 5/2015 | Sugaya et al. |
| 2015/0168365 | A1 | 6/2015 | Conner |
| 2015/0177055 | A1 | 6/2015 | Lian et al. |
| 2015/0177056 | A1 | 6/2015 | Lian et al. |
| 2015/0177057 | A1 | 6/2015 | Lian et al. |
| 2015/0177058 | A1 | 6/2015 | Lian et al. |
| 2015/0177059 | A1 | 6/2015 | Lian et al. |
| 2015/0177063 | A1 | 6/2015 | Lian et al. |
| 2015/0294080 | A1 | 10/2015 | Garnavi et al. |
| 2015/0346025 | A1 | 12/2015 | Spinella et al. |
| 2015/0347625 | A1 | 12/2015 | Werneck et al. |
| 2016/0109959 | A1 | 4/2016 | Heo |
| 2016/0363479 | A1 | 12/2016 | Dumont et al. |
| 2016/0364131 | A1 | 12/2016 | Dumont et al. |
| 2017/0115162 | A1 | 4/2017 | Dumont et al. |
| 2017/0118854 | A1 | 4/2017 | Dumont et al. |
| 2017/0268928 | A1 * | 9/2017 | Chow ............... G01J 3/0297 |
| 2018/0306639 | A1 * | 10/2018 | Mehrl ............... G01J 1/08 |

FOREIGN PATENT DOCUMENTS

| | | | |
|---|---|---|---|
| WO | WO2005/103923 | A2 | 11/2005 |
| WO | WO2011/094742 | A2 | 8/2011 |
| WO | WO2013/034288 | A1 | 3/2013 |
| WO | WO2013/106653 | A1 | 7/2013 |
| WO | WO-2014102629 | A1 * | 7/2014 ............... G01J 1/08 |

OTHER PUBLICATIONS

Amini et al.; A wireless embedded device for personalized ultraviolet monitoring; Biodevices; 9; pp. 200-205; 2009.

Bharatula et al.; Towards wearable autonomous microsystems; Pervasive Computing: Proceedings of the 2nd Int'l Conference; pp. 225-237; Vienna, Austria; Apr. 18-23, 2004.

CDC; Sunburn prevalence among adults—United States 1991, 2003 and 2004; MMWR Weekly; 56(21); pp. 524-528; (9 pgs. printed); Jun. 1, 2007.

Chang et al.; Sun exposure and melanoma risk at different latitudes: a pooled analysis of 5700 cases and 7216 controls; Int J Epidemiol.; 38(3); pp. 814-830; Jun. 2009.

Chiche et al.; Seasonal variations of systemic lupus erythematosus flares in southern France; Eur. J. Intern. Med.; 23(3); pp. 250-254; Apr. 2012.

Corral et al; Bright light therapy's effect on postrpartum depression; Am J Psychiatry; 157(2); pp. 303-304; Feb. 2000.

Corrêa et al.; Comparison between UV index measurements performed by research-grade and consumer-products instrucments; Photochem. Photobiol. Sci.; 9; pp. 459-463; online: Mar. 19, 2010.

Cortes et al.; Support-vector networks; Machine Learning; 20(3); pp. 273-297; Sep. 1995.

Dennis et al.; Sunburns and risk of cutaneous melanoma: does age matter? A comprehensive meta-analysis; Ann Epidemiol; 18(8); pp. 614-627 (author manuscript, 25 pgs printed); Aug. 2008.

Diffey et al.; The standard erythema dose: a new photobiological concept; Journal of Photodermatology, Photoimmunology & Photomedicine; 13(1-2); pp. 64-66; Feb./Apr. 1997.

Environmental Protection Agency; Ultraviolet and Ozone Monitoring Program (program information); retrieved Oct. 24, 2016 from the Internet archive: (http://web.archive.org/web/20080516110808/http://www.epa.gov/uvnet/); last updated: Jan./Feb. 2008.

Fahrni et al.; Sundroid: Solar Radiation Awareness with Smartphones; Proceedings of the 13th Int'l Conf. on Ubiquitous Computing (UbiComp '11); Beijing, China; pp. 365-374; Sep. 17-21, 2011.

Ferguson et al.; Voluntary exposure of some western-hemisphere snake and lizard species to ultraviolet-B radiation in the field: How (56) References Cited

OTHER PUBLICATIONS much ultraviolet-B should a lizard or snake receive in captivity?; Zoo Biol; 29(3); pp. 317-334; May/Jun. 2010.
Gerd Neumann Jr.; Deep-Black Optical Paint (product page); 1 pg.; retrieved from the internet: (http://www.gerdneumann.net/english/instrument-building-parts-teile-fuer-den-fernrohrbau/totmatte-schwarze-optikfarbe-deep-black-optical-paint.html) on Oct. 24, 2016.
Hartigan et al.; Algorithm AS 136: A K-Means Clustering Algorithm; Journal of the Royal Statistical Society. Series C (Applied Statistics); 28(1); pp. 100-108; 1979.
Hartigan, John A.; Clustering Algorithms; John Wiley & Sons, Inc.; pp. 84-99; Apr. 1975.
Heckman et al.; Minimal erythema dose (MED) testing; J. Vis. Exp.; 75; e50175; 5 pgs.; May 2013.
Heydenreich et al.; Miniature personal electronic UVR dosimeter with erythema response and time-stamped reading in a wristwatch; Photochem Photobiol.; 81(5); pp. 1138-1144; Sep./Oct. 2005.
Horsley et al.; Current action for skin cancer risk reduction in English schools: pupils' behaviour in relation to sunburn; Health Educ Res.; 17(6); pp. 715-731; Dec. 2002.
Indiegogo; SunFriend UV Daily Activity Monitor (product information); 8 pgs.; retrieved from the internet (https://www.indiegogo.com/projects/sunfriend-uv-daily-activity-monitor) on Oct. 19, 2016.
Klein et al.; Analysis of compact fluorescent lights for use by patients with photosensitive conditions; Photochem Photobiol; 85(4); pp. 1004-1010; (15 pgs., author manuscript version); Jul./Aug. 2009.
Larason et al.; Sources of error in UV radiation measurements; J. Res. Natl. Inst. Stand. Technol.; 106(4); pp. 649-656; Jul./Aug. 2001.
Lindgren et al.; Measuring effective vitamin D3-producing ultravioloet B radiation using Solartech's Solarmeter 6.4 Handheld, UVB radiometer®; Bull. Chicago Herp. Soc.; 43(4); pp. 57-62; 2008.
Mackenzie; The analysis of the ultraviolet radiation doses required to produce erythemal responses in normal skin; Br. J. Dermatol.; 108(1); pp. 1-9; Jan. 1983.
McKinlay et al.; A reference action spectrum for ultra-violet induced erythema in human skin; CIE J.; 6(1); pp. 17-22; Mar. 1987.
Microsoft; Microsoft Band Official Site; Live healthier and be more productive (product information); 22 pgs.; retrieved from the internet (http://www.microsoft.com/microsoft-band/en-us) on Dec. 9, 2014.
NASA; Actillume (hardware information page); 1 pg.; retrieved from the internet: (https://lsda.jsc.nasa.gov/scripts/hardware/hardw.aspx?hardware_id=173) on Oct. 21, 2016.
Natatmo; Be Sun Savvy: JUNE by netatmo (product information); 6 pgs.; Jan. 5, 2014 (product date: 2011).
Oren et al.; An Open Trial of Morning Light Therapy for Treatment of Antepartum Depression; American Journal of Psychiatry; 159(4); pp. 666-669; Apr. 2002.
pveducation.org; Spectral Irradiance; 1 pg.; retrieved from the internet: (http://www.pveducation.org/pvcdrom/2-properties-sunlight/spectral-irradiance); on Oct. 24, 2016.
Rabin; A portable glow to help melt those winter blues; New York Times (p. D5) 4 pgs.; Nov. 15, 2011.
Rensselaer, Lighting Research Center; Demesimeter—Light and Activity Measurement System Description and Calibration; 14 pgs.; Sep. 2, 2011 (rev. Nov. 15, 2011).
Rogers et al.; Prevalence and determinants of sunburn in Queensland; Health Promot J Austr.20(2); pp. 102-106; Aug. 2009.
Sayre et al.; Skin type, minimal erythema dose (MED), and sunlight acclimatization; Am. Acad. Dermatology; 5(4); pp. 439-443; Oct. 1981.
SBIR (STTR); Actillume—A monitor for activity and light exposure (research information); 2 pgs.; retrieved from the internet: (https://lsda.jsc.nasa.gov/scripts/hardware/hardw.aspx?hardware_id=173) on Oct. 21, 2016.
Schmalwieser et al.; A first approach in measuring, modeling and forecasting the vitamin D effective UV radiation; SPIE Proceedings; vol. 6362; Remote Sensing of Clouds and the Atmosphere XI, 63622C; Stockholm, Sweden; 9 pgs.; Sep. 11, 2006.
Solartech, Inc.; Radiometer UV Index: Model 6.5 (product information: SM/Sensors/Model 6.5 UV_Index Sep. 2015); 2 pgs.; retrieved from the internet (http://www.solarmeter.com/model65.html) on Oct. 19, 2016.
Solartech, Inc.; Solarmeter Model 5.0 UV Meter; 2 pgs.; retrieved from the internet (http://www.solarmeter.com/model5.html) on Oct. 19, 2016.
Solartech, Inc.; Solarmeter Model 6.5 UV Meter; 4 pgs.; retrieved from the internet (http://www.solarmeter.com/model65.html) on Oct. 19, 2016.
Sunsprite; Sunsprite Personal Light Tracker (product information); © 2016; 6 pgs.; retrieved from the internet (https://www.sunsprite.com/) on Oct. 19, 2016.
Thieden et al.; The wrist is a reliable body site for personal dosimetry of ultraviolet radiation; Journal of Photodermatology, Photoimmunology & Photomedicine; 16(2); pp. 57-61; Apr. 2000.
Weichenthal et al.; Phototherapy: how does UV work?; Photodermatol Photoimmunol Photomed.; 21(5); pp. 260-266; Oct. 2005.
Wikipedia; Bluetooth low energy; 11 pgs.; retrieved from the internet (https://en.wikipedia.org/wiki/Bluetooth_low_energy) on Oct. 21, 2016.
Wikipedia; Diffuser (optics); 2 pgs.; retrieved from the internet (https://en.wikipedia.org/wiki/Diffuser_(optics)) on Oct. 21, 2016.
Wikipedia; Lambert's cosine law; 4 pgs.; retrieved from the Internet (https://en.wikipedia.org/wiki/Lambert's_cosine_law) on Oct. 21, 2016.
Wikipedia; Norm (mathetics): 3.2 Euclidean norm (definition); 10 pgs.; retrieved from the internet: (https://en.widipedia.org/wiki/Norm_(mathematics)#Euclidean_norm) on Oct. 24, 2016.
Wikipedia; Solar zenith angle; 2 pgs.; retrieved from the Internet (https://en.wikipedia.org/wiki/Solar_zenith_angle) on Oct. 21, 2016.
Wirz-Justice; A randomized, double-blind, placebo-controlled study of light therapy for antepartum depression; J Clin Psychiatry; 72(7); pp. 986-993; Jul. 2011.
Zayat et al.; Preventing UV-light damage of light sensitive materials using a highly protective UV-absorbing coating; Chem Soc Rev.; 36(8); pp. 1270-1281; Aug. 2007.
Dumont et al.; Design U.S. Appl. No. 29/575,549 entitled "Sensing Device", filed Aug. 25, 2016.
Xu et al.; Characterization and calibration of broadband ultraviolet radiometers; Metrologia; 37(3); pp. 235-242; Jun. 2000.

\* cited by examiner

METHODS, SYSTEMS, AND DEVICES FOR CALIBRATING LIGHT SENSING DEVICES

CROSS REFERENCE TO RELATED APPLICATIONS

This application claims priority to U.S. Provisional Application No. 62/346,987, filed Jun. 7, 2016, the disclosure of which is incorporated by reference herein in its entirety.

INCORPORATION BY REFERENCE

All publications and patent applications mentioned in this specification are herein incorporated by reference to the same extent as if each individual publication or patent application was specifically and individually indicated to be incorporated by reference.

BACKGROUND

Why measure personal UV radiation? Solar ultraviolet (UV) light reaching the earth's surface is radiation in the wavelength range of 280-400 nm. It has critical impact on humans. The skin synthesizes Vitamin D using UV exposure, which makes it necessary for health. But overexposure to UV can cause adverse effects such as immune reactions in lupus, sunburns, or phototoxicity in the short term, and skin cancer in the longer term. Sensitivity to ultraviolet radiation varies from person to person (e.g., darker skin types are at lower risk for sunburn), from disease to disease, from pharmaceutical treatment to pharmaceutical treatment, etc. Reaction to UV depends not only on the instantaneous strength of the UV radiation, but also the time over which a person is exposed to it. The accumulated UV radiation over time is called the UV dose.

Sun-related activity varies from individual to individual. Outdoor runners are more exposed to UV than indoor treadmill runners. Certain professions, such as construction, involve large exposure to UV on a daily basis, while traditional office jobs involve lower UV exposure. Under such circumstances, the primary way to be able to control any symptom of overexposure (such as sunburn, immune reaction, and phototoxicity), is to have an accurate knowledge of personal UV dose. US20170115162A1 describes exemplary systems and methods that include a wearable device that is adapted to measure and aggregate the UV exposure information, while a mobile device is adapted to display metrics and alerts to the user based on this information.

How to measure UV radiation? In 1987, the human sensitivity to ultraviolet radiation was defined by Diffey and later adopted by the World Metereological Organization and the World Health Organization. This sensitivity is called the "Erythema action spectrum" and gives exponentially more importance to high-energy photons. This standard metric is called the ultraviolet index (UV Index, or "UVI") when ultraviolet exposure is measured on a horizontal plan.

Typical UV measuring systems include a UV measuring diode (or a set of them), which converts the incident ultraviolet radiation signal to electric current, coupled with additional circuitry. This includes an analog-to-digital converter (ADC), op-amp and microcontroller (Amini N., Matthews E. J., Vandatpour A., Dabiri F., Noshadi H., Sarrafzadeh M., "A Wireless Embedded Device for Personalized Ultraviolet Monitoring," *International Conference on Biomedical Electronics and Devices*, pp. 200-205 (2009)). Some examples of these systems are the Solarmeter® 6.5 UVI and the Genicom UV Index Meter.

Why is accuracy important? Many human bodily functions are dependent on UV, while several conditions are activated by it. For some of these conditions, such as phototoxicity and photocarcinogenicity, it is important to know the activation threshold—and it varies from person to person. For others, such as sunburn, safety thresholds are known according to skin type, but it is vital to know current exposure relative to such thresholds. Overestimation can lead us to determine higher thresholds than reality, which leads to dangerous overexposure. Underestimation can lead to longer periods spent out in the sun, which can easily cause sunburn. This makes accuracy of extreme importance in the measurement of UV exposure.

An approximate forecast for the maximum daily UV Index is usually provided by local weather services, but is largely inadequate for measuring personal UV exposure. It assumes the orientation of the person to be flat on the ground, which is the case only very infrequently. Further, it does not account for the presence of reflective environments like water and sand, which can greatly increase UV exposure, or the variation of the UV index over the course of the day with time and weather. Finally, it does not take into account secondary radiation in the shade or through windows.

What is calibration? The disclosure herein on calibration applies generally to a wide variety of radiometer systems, whether they are referenced herein or not. Some aspects of the calibration concepts herein, however, may be related to UV sensing devices, or at least some functionality of UV sensing devices, which may be expressly described herein. The disclosure herein related to calibration is thus not limited to particular UV sensing devices expressly provided herein, however some calibration methods or concepts herein may be enabled by one or more of the UV sensing devices herein.

The input to exemplary radiometer systems is the solar spectrum, which can be represented as the spectral irradiance $s(\lambda)$. Spectral irradiance is the radiant flux received per unit area per unit wavelength, and is represented in the units of $Wm^{-2}nm^{-1}$ (http://www.pveducation.org/pvcdrom/properties-of-sunlight/spectral-irradiance). The output of the radiometer ($p_{measured}$) is the spectral response of the radiometer $r(\lambda)$ convolved with this input spectral distribution (Eq. 1).

$$p_{measured} = \int_{\lambda=-\infty}^{\infty} s(\lambda) r(\lambda) \qquad \text{Eq. (1)}$$

Figure 1A:
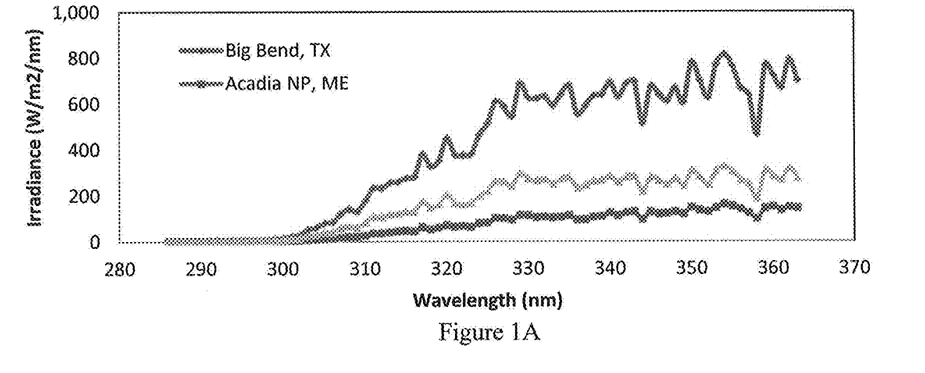
FIG. 1A shows spectral data taken at approximately local noon on Sep. 3, 2000 at three different locations.

The actual value of the property is the ideal response is $\hat{r}(\lambda)$ convolved with the same spectral distribution $s(\lambda)$ (Eq. 2). Some examples of ideal response are shown in FIG. 1A below.

$$p_{ideal} = \int_{\lambda=-\infty}^{\infty} s(\lambda) \hat{r}(\lambda) \qquad \text{Eq. (2)}$$

The calibration process adjusts for two main problems: 1) Manufacturing variations, and 2) the difference between the ideal response required by the radiometer's specifications and the actual spectral response of the radiometer. Calibration usually utilizes a least squares minimization on a set of known values ($p_{known}$) versus measured ($p_{measured}$) (values to adjust $p_{measured}$ (Eq. 3):

$$r(\lambda) = \mathrm{argmin}_{r(\lambda)} \| P_{measured} - P_{known} \| \qquad \text{Eq. (3)}$$

How does calibration impact accuracy? Proper calibration of a radiometer requires its traceability to a governmental agency of standards, such as the National Institute of Standards and Technology in the United States or the Physikalisch-Technische Bundesanstalt in Germany. To claim such traceability, radiometers need to be calibrated against a traceable calibrated source, a traceable calibrated spectroradiometer or radiometer, or both. Calibration ensures that variability in the manufacturing does not affect the measurement.

Typically, calibration is performed after manufacturing of the instrument and thereafter every year, usually using a stable electromagnetic source, i.e., with a single $p_{known}$ and $p_{measured}$. An ideal spectral response cannot be achieved in practice, and if such ideal behavior is required for the radiometer's measurement (e.g., the radiometer is required to measure the UV index)—which is the case for most radiometers—this calibration method does not guarantee the accuracy of radiometers in different environments, where the spectra to be measured are different from the calibration spectrum. The error incurred as a result is called the spectral mismatch error (see Xu, G. & Huang, X. Characterization and calibration of broadband ultraviolet radiometers. *Metrologia* 37, 235-242 (2003)). This may be acceptable for applications where the focus is on measuring the radiant flux of a source for which the spectral distribution is known, e.g., a UVA radiometer used to measure photoresist exposure in ultraviolet lithography is calibrated using the same source that is used for lithography. However, when sensing personal UV exposure, the radiometer/dosimeter is meant to measure UV irradiance from solar spectra, which varies greatly according to location and time of the day.

Figure 1B:
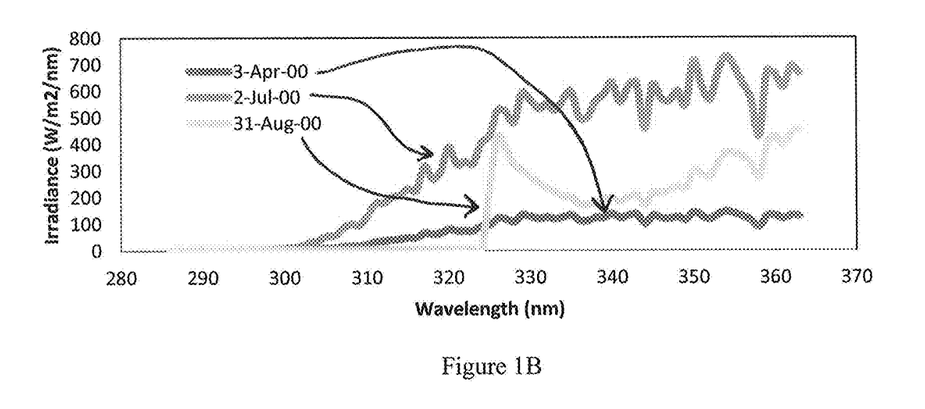
FIG. 1B shows spectral data taken from one location on different dates.

The US Environmental Protection Agency (EPA) UVNET database illustrates how spectral distributions vary from location to location. This is a publicly available database containing Brewster spectrometer scans from various locations in the USA, taken at different times of the year, on multiple years. The included locations are as far north as Acadia National Park, Me. to as far south as Big Bend, Tex., and hence cover a broad range of latitudes. Locations at altitude such as Albuquerque, N. Mex. (5000 feet above sea-level) are also included. The Brewster spectrometer scans wavelengths from 286 nm to 363 nm. FIG. 1A shows three scans taken at approximately local noon on Sep. 3, 2000 at three different locations. This spectral data was obtained from Environmental Protection Agency, U. Ultraviolet and Ozone Monitoring Program: UV-Net. (2008). At http://www.epa.gov/uvnet/. The top scan is from Big Bend, Ill., the middle scan is from Albuquerque, N.Mex., and the bottom scan is from Acadia NP, Me. The difference in the spectral distributions is evident. FIG. 1B shows spectral scans on different days of the year from Big Bend, Tex. at local noon, and illustrates that similar differences are observed at the same location on different days of the year at the same time. UV radiometer/dosimeter systems that are measuring personal UV exposure need to measure UV irradiance from all these different situations accurately. To accomplish this, calibration using a single source that is non-representative of the sun is inadequate.

Figure 2:
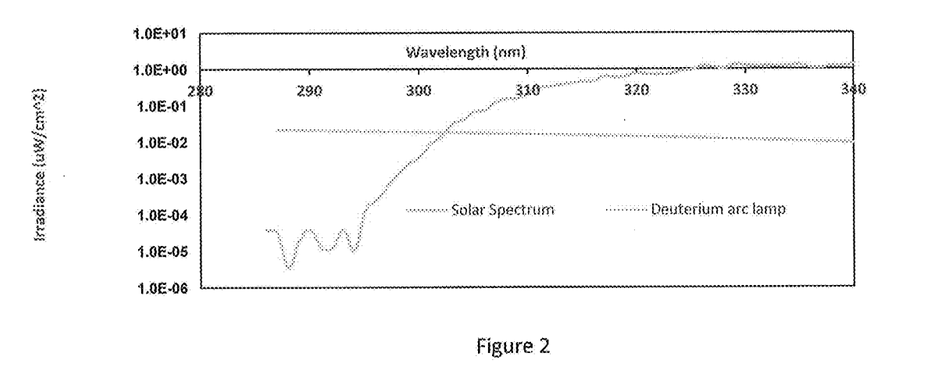
FIG. 2 shows the solar spectrum in comparison to that of a deuterium arc lamp.

FIG. 2 further shows the solar spectrum in comparison to that of a deuterium arc lamp, which is typically used in calibrating UV radiometers (the fairly straight line is that of the deuterium arc lamp, while the other line is the solar spectrum). It is evident from FIG. 2 that this calibration source greatly differs from the solar spectrum in the UV region, which means a UV radiometer calibrated using the arc lamp source is very likely to be inaccurate when measuring solar UV.

Existing Approaches. There have been a few proposed systems for calibrating radiometers, such as those described in U.S. Pat. Nos. 6,729,756, 4,726,688, and 6,439,763, which are incorporated by reference herein. U.S. Pat. No. 6,729,756 describes a method for calibrating a microwave radiometer for a satellite. This utilizes a hot and cold calibration source. Such radiometers are much higher power and measure much larger wavelengths compared to UV radiometers and dosimeters being used to sense personal UV exposure, and hence the calibration apparatus is much larger and different in nature. U.S. Pat. No. 4,726,688 describes measuring infra-red radiation from sunlight. The calibration source consists of a heater attached to a sensing plate, and is very different from some calibration sources described herein, which include a plurality of light sources, such as a plurality of light-emitting diodes ("LEDs"). The third system in U.S. Pat. No. 6,439,763 describes radiometers measuring thermal radiation, which is not directly relevant to the proposed UV measuring systems herein.

The idea of custom calibration has been proposed as early as 1991, such as in U.S. Pat. No. 5,204,532. This method describes a custom calibration for infra-red based blood glucose sensors, which can be tuned to each individual user. This is a necessity for the field because different individuals have different base energy absorption rates, depending on water, fat and protein content in the body. For UV sensing, a general calibration may be sufficient, but a custom calibration based on location information can improve accuracy. One exemplary method of improving accuracy is by clustering a plurality of calibration functions based on binning of location parameters (e.g., solar zenith angle), which is described below.

U.S. Pat. No. 7,230,222 described the idea of using multiple light-emitting diodes (LEDs) to form a calibration source to mimic a single spectrum constituting white light. This disclosure, however, fails to describe or teach how to make a calibration source programmable so that it can, for example, replicate or mimic a plurality of spectra, which is described herein below. U.S. Pat. No. 6,967,447 discusses using multiple light-emitting sources with different current drivers so as to be programmable. However, it fails to teach how to derive the current for each light source to form a spectrum, which is something that the disclosure below provides in detail. The disclosures of U.S. Pat. Nos. 7,230, 222 and 6,967,447 related to electronics, circuitry, and components, however, are fully incorporated by reference herein and by incorporated into embodiments herein.

Base on the deficiencies of these existing systems, there is a need for improved methods and systems for calibrating UV radiometers and UV dosimeters to enhance the accuracy of the measurements.

SUMMARY OF THE DISCLOSURE

One aspect of the disclosure is a calibration apparatus for calibrating a UV sensing device, comprising: a calibration chamber sized and configured to house therein a UV sensing device; and a plurality of light sources positioned relative to the chamber to emit light into the chamber, wherein the intensity of light from at least one of the plurality of light sources is individually controllable. The spectrum of light from at least one of the plurality of light sources, and optionally all of the plurality of light sources, can have a center wavelength that is different from each of the center wavelengths of all of other plurality of light sources. At least one of the plurality of light sources can be individually controllable by varying current delivered from a source to the at least one of the plurality of light sources. At least one of the plurality of light sources can be coupled to an individual current driver. The intensity of light from each of the plurality of light sources can be individually controllable.

One aspect of the disclosure is a method of calibrating a UV sensing device, comprising: positioning a UV sensing device inside a calibration chamber; emitting light from a calibration source at the UV sensing device, the calibration source adapted to mimic a representative spectrum, wherein the representative spectrum comprises information representing the intensity of light at a plurality of wavelengths, the representative spectrum based on at least one of a time and a location; and recording an output from the UV sensing device in response to the emitted calibration light.

In some embodiments the method further comprises calculating a calibration function for the UV sensing device based on the recorded output from the UV sensing device, and storing the calibration function in a memory. The method can further comprise: emitting second calibration light at the UV sensing device, the second calibration light adapted to mimic a second representative spectrum; recording a second output from the UV sensing device in response to the emitted calibration light; and calculating a second calibration function for the UV sensing device based on the second recorded output from the UV sensing device, and storing the second calibration function in the memory.

In some embodiments the method further comprises emitting second calibration light at the UV sensing device, the second calibration light adapted to mimic a second representative spectrum; and recording a second output from the UV sensing device in response to the emitted second calibration light. The method can further comprise calculating a calibration function for the UV sensing device based on the output and the second output from the UV sensing device, and storing the calibration function in a memory. The representative spectrum and the second representative spectrum can be grouped in executable instructions, wherein the grouping is based on at least one of solar zenith angle, a time and a location of the respective representative spectrum, and the calibration function is stored in memory such that a relationship exists in the memory between the calibration function and the grouping.

In some embodiments emitting calibration light that is adapted to mimic a representative spectrum comprises emitting light from a plurality of light sources, at least one of the light sources (and optionally all of them) having a different center wavelength, and individually controlling the intensity of at least one of the plurality of light sources, optionally by varying current that is being delivered to the at least of the plurality of light sources, and wherein the superposition of the intensities of light from the plurality of light sources mimics the representative spectrum.

One aspect of the disclosure is a calibration apparatus for calibrating a UV sensing device, comprising: a calibration chamber sized and configured to house therein a UV sensing device; and a UV sensing device stabilization element disposed inside the chamber, the stabilization element adapted and configured to interface with at least a portion of the UV sensing device to stabilize the UV sensing device with respect to at least one type of movement. The stabilization element can comprise a magnetic element, optionally an annular magnetic element. The stabilization element can comprise a USB cable head.

One aspect of the disclosure is a calibration apparatus for calibrating a UV sensing device, comprising: a calibration chamber sized and configured to house therein a UV sensing device, wherein all of the internal surfaces of the calibration chamber are coated with a UV absorbing material.

One aspect of the disclosure is a method of calculating a plurality of calibration functions for a UV sensing device, comprising: calculating a first calibration function for a UV sensing device, wherein the first calibration function is based at least partially on a first output from the UV sensing device in response to a first calibration source; and calculating a second calibration function for the UV sensing device, wherein the second calibration function is based at least partially on a second output from the UV sensing device in response to a second calibration source. The method can further comprise storing the first and second calibration functions in a memory device.

One aspect of the disclosure is a method of creating a plurality of representative spectra for use in calibrating a UV sensing device, comprising: selecting a plurality of spectral data (optionally from a database of measured spectra), each of the plurality of spectral data comprising information representing the intensity of light at a plurality of wavelengths, and each of the plurality of spectral data based on at least one of a time and a location; and storing the selected plurality of spectral data or information indicative of the selected plurality of spectral data in a group on a memory device to thereby create a plurality of representative spectra. In some embodiments selecting the plurality of spectral data comprises selecting only a subset of spectral data from a larger group of spectral data. In some embodiments the method further comprises calling a first one of the plurality of representative spectra, and calibrating the UV sensing device by activating a calibration source and mimicking the first one of the plurality of representative spectra with the calibration source. In some embodiments storing the selected plurality of spectra data in a group comprises grouping the plurality of spectral data based on the solar zenith angle associated with each of the plurality of spectral data to thereby create the plurality of representative spectra. In some embodiments selecting the plurality of spectral data comprises using a clustering algorithm. In some embodiments each of the representative spectra is unique in at least one of time and location.

One aspect of the disclosure is an apparatus for storing and accessing representative spectra for use in calibrating a UV sensing device, comprising: a memory device having stored thereon instructions for allowing one of a plurality of representative spectra to be selected and used in a process to calibrate a UV sensing device, each of the plurality of representative spectra comprising information representing the intensity of light at a plurality of wavelengths, and each of the plurality of representative spectra based on at least one of a time and a location; and a processor in communication with the memory device, wherein the instructions stored on the memory are executable by the processor upon activation of a calibration process that calibrates the UV sensing device with a calibration source that is based on the one of the plurality of representative spectra. The plurality of representative spectra can be grouped together in a bin based on a solar zenith angle associated with each of the plurality of representative spectra. The apparatus can further comprise a calibration system, wherein the calibration system comprises the apparatus for storing and accessing representative spectra. The memory can further have stored thereon instructions for programming the calibration source with one of the plurality of representative spectra.

One aspect of the disclosure is a method of retrieving a calibration function for a UV sensing device, comprising: providing a UV sensing device that comprises a location chip and a clock; and retrieving one of a plurality of stored calibration functions for the UV sensing device based on at least one of a time where the UV sensing device is located, and a location of the UV sensing device. The retrieving step can comprise determining a solar zenith angle, and retrieving one of the plurality of stored calibration functions that is associated with the solar zenith angle. The retrieving step can comprise wirelessly retrieving one of the plurality of stored calibration functions that are stored on a remote storage device. The method can further include communicating the solar zenith angle to a storage device, wherein the storage device retrieves one of the plurality of stored calibration functions based on the communicated solar zenith angle.

One aspect of the disclosure is a device that is part of a UV sensing system, the device comprising: a location chip, a clock, a memory with computer executable instructions stored thereon, and a processor, the instructions executable by the processor, the computer executable instructions adapted to determine a solar zenith angle based on at least one of the location of the device and the time where the device is located. The device can further include a communication element adapted to wirelessly communicate the solar zenith angle with a remote storage device.

One aspect of the disclosure is a device adapted for storing calibration functions for a UV sensing device, comprising: a storage device having stored thereon a plurality of calibration functions for a UV sensing device, each of the plurality of calibration functions associated with a solar zenith angle. The device can further include a communication component adapted to wirelessly receive a communication from a remote device that is part of a UV sensing system, and to communicate a retrieved calibration function to the remote device in response to the communication from the remove device. The device can further include executable instructions adapted to retrieve one of the plurality of the calibration functions based on information from the remote device that is indicative a solar zenith angle.

One aspect of the disclosure is a method, comprising: storing a plurality of calibration functions for a UV sensing device in a memory device, each of the plurality of calibration functions being associated with a solar zenith angle, wherein the calibration functions were calculated while calibrating the UV sensing device with a plurality of different calibration sources.

DETAILED DESCRIPTION

The disclosure herein relates to the accurate and real-time measurement of personal ultraviolet (UV) radiation exposure from sunlight. Exemplary systems and methods to perform such measurements have previously been proposed, such as in US20150177055A1, US20150177056A1, US20150177057A1, US20150177058A1, US20150177059A1, and US20170115162A1, the disclosures of which are incorporated by reference herein. US20170115162A1 shares two inventors with the instant application, and the methods, systems, and apparatuses therein can be used with the calibration disclosure herein. Some of the exemplary systems include a wearable device with one or more sensors, which are adapted to wirelessly communicate with a mobile device (such as a smartphone or tablet). The systems can behave as both a radiometer (instantaneous UV measurements) and a dosimeter (aggregating the instantaneous measurements). This disclosure describes various systems used to calibrate a radiometer, in order to make it accurate in a wide variety of real usage scenarios.

While the disclosure herein focuses on UV sensing calibration, the concepts herein can be applied to other types of light sensing devices. Methods and systems herein can thus be generalized for use with "light sensing devices," not just UV sensing devices.

The following disclosure on calibration applies generally to a wide variety of radiometer systems, whether they are referenced herein or not. Some aspects of the calibration concepts that follow, however, are related to some UV sensing devices, or at least some functionality of some UV sensing devices, described herein, such as in US20170115162A1. The following disclosure on calibration is thus generally not limited to any particular UV sensing device, but some calibration methods or concepts below may be enabled by one or more of the UV sensing devices described herein.

This disclosure describes systems, devices, and methods for calibrating UV radiometers to measure, with superior accuracy, several sources of UV radiation or the same source (e.g., solar UV) in a wide variety of conditions (e.g., secondary radiation). One aspect of this disclosure provides exemplary methods for mining historical spectral data from various locations and grouping them to derive an optimal set of spectra to use for calibration, henceforth referred to as the representative spectra. "Representative spectra" as used herein may also be referred to as a "plurality of representative spectra." Another aspect of this disclosure describes a calibration source that comprises a plurality of light sources, such as LEDs, which are capable of being used to mimic at least one spectrum and in some embodiments a representative spectra. Another aspect of the disclosure is a way of stabilizing a radiometer in a calibration device. In some embodiments, a magnetic stabilization method and devices can be used to ensure that each radiometer undergoing calibration is free of tilt. Some embodiments can further ensure that each radiometer in calibration is oriented in the same direction by utilizing screw holes on the radiometer, or a USB charging port on the radiometer to stabilize the radiometer. Another aspect of the disclosure is related to minimizing stray light inside a calibration chamber in order to accurately mimic a representative spectra. In some embodiments a UV absorbing film or paint is coated on the inner surfaces of the calibration chamber. The aspects described above can stand alone as inventive concepts, and need not rely on other aspects for patentability. The disclosure below may describe them in the context of overall methods and systems, but the disclosure is not so limited.

Figure 3:
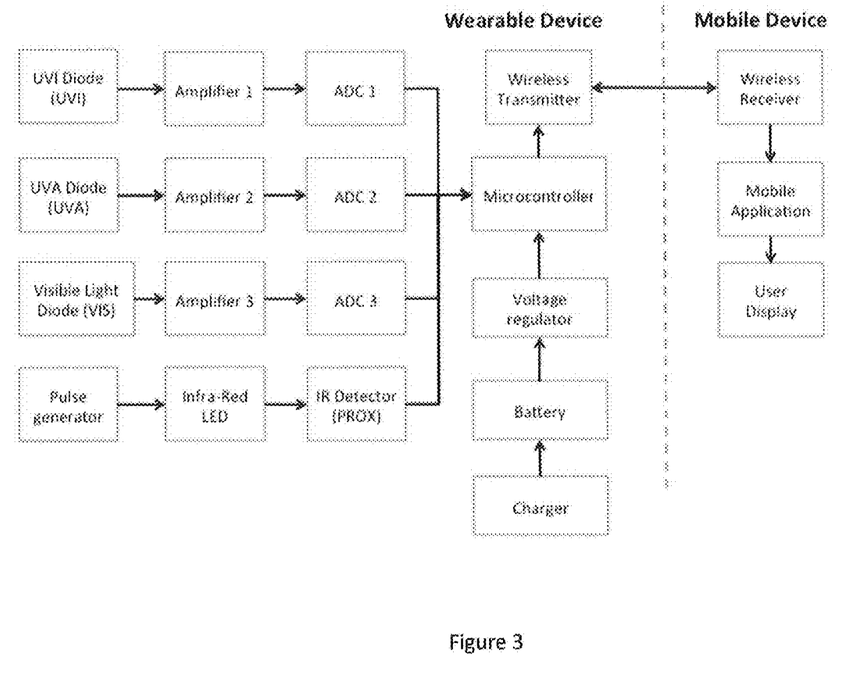
FIG. 3 illustrates a merely exemplary light sensing system that can be calibrated and used according to the disclosure herein.

FIG. 3 illustrates an exemplary system for accurate and real-time monitoring of ultraviolet exposure. FIG. 3 is very similar to FIG. 1 from US20170115162A1, and the entire contents of FIG. 1 from US20170115162A1 are incorporated by reference herein in the context of FIG. 3. FIG. 3 illustrates a merely exemplary system that can be used with the calibration systems, devices, and methods herein. As set forth above, this disclosure as it relates to calibration is not meant to be limited to the specific UV sensing devices herein, although some of the UV sensing devices described herein may specifically benefit from one or more aspects of calibration methods herein.

The system in FIG. 3 includes two sub-systems. The first is a wearable device, which includes one or more radiation sensors. All of the sensors are connected to a microcontroller via one or more transimpedance amplifiers, which itself is powered by an on-board battery. The microcontroller transmits collected data via a wireless transmitter following a certain protocol such as Bluetooth Low Energy. The other sub-system is a mobile device, which can be a typical handheld device such as a smartphone or tablet which has a wireless receiver that follows the same protocol as the transmitter on the wearable device (e.g., Bluetooth Low Energy). Collected data is received by an application running on the mobile device, which interfaces with the user via a display containing one or more pieces of information about the user's UV exposure. The system in FIG. 3 a unique and non-obvious combination of one or more sensors, capable of measuring erythemally-weighted UV radiation at high accuracy and in real-time.

Figure 4A:
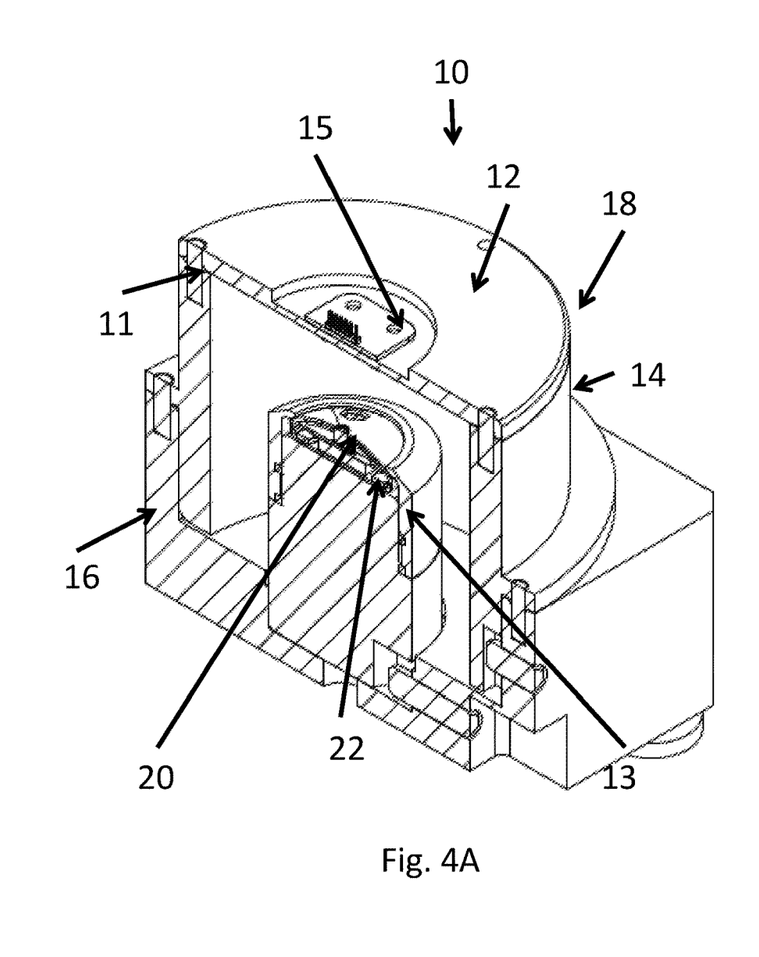
FIGS. 4A and 4B illustrate a merely exemplary calibration device.
Figure 4B:
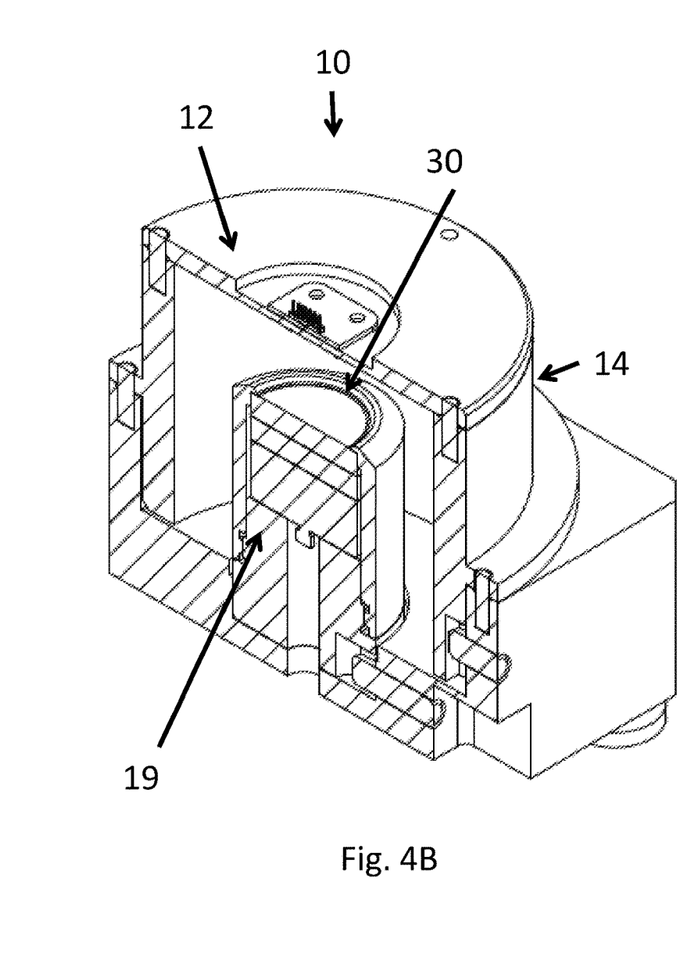

In order to achieve superior accuracy, the calibration of this and any other radiometer is of critical importance. FIGS. 4A and 4B show an exemplary calibration system 10 used for the exemplary radiometer. The system is composed of a calibration chamber 18 that includes lid 12. body portion 14. base 16. radiometer support 19, and radiometer holder 13. The chamber is defined by the surfaces of the respective components (e.g., bottom surface of lid 12, inner surface of body 14, etc.) Radiometer 20 (in this embodiment radiometer is the same or substantially the same as the UV sensing device from FIG. 2 in 2017/0115162, the disclosure of which is incorporated by reference herein) is placed on support 19, and stabilized at least partly by radiometer holder 13. Holder 13 extends over the periphery of the radiometer 20 to help stabilize it. Screws 11 (only 1 is labeled) or other types of devices can be used to secure the body 14 to base 16, and to secure lid 12 to body 14. In this embodiment radiometer 20 includes a USB port 22 on its bottom side. system 10 includes a mating element therein to mate with the USB port and help stabilize radiometer 20 therein. System 10 can also include a channel or opening as shown in FIGS. 4A and 4B to allow for electronics out of the system. which can allow for one or more electrical signals to be communicated out of the system (e.g., an output from the radiometer in response to calibration light).

Calibration system 10 also includes one or more calibration source 15, which can be coupled to lid 12 or integrated with lid 12. Calibration source 15 includes a plurality of light sources, such as LEDs. The LEDs are each coupled to an individually controlled driver (not shown in FIGS. 4A and 4B).

Calibration source is positioned to be above radiometer 20 (above the sensor). The UV sensor includes at least one UV sensor facing generally upward toward calibration source 15. Support 19 is below radiometer 20 and generally support the bottom of radiometer 20. Holder 13 is generally radially outward relative to radiometer 20, but a top portion of holder 13 (which is also annular in this embodiment) engages with a peripheral portion of radiometer 20.

Holder 13 can interchangeably hold a calibrated U V radiometer (or spectroradiometer) or the UV radiometer undergoing calibration. Source 15 comprises multiple light emitting diodes (LEDs) with different center wavelengths. Each LED has its own current driver, which allows individual control over its intensity, since the intensity is controlled by the amount of input current. The calibration source spectrum is the superposition of the individual LED spectra. The control over LED current allows the replication or mimicking of different spectra, such as a plurality of representative spectra. Body 14, source 15 (which may be considered the same as lid 12), base 16, and support 19 are adapted to be positioned together to form an enclosed unit or chamber that does not allow any light to escape, so that no errors are incurred during calibration. Additional features of the exemplary system 10 are described below.

FIG. 4A shows exemplary radiometer 20 that is undergoing calibration, and FIG. 4B illustrate an exemplary spectrometer 30 in place within the chamber.

The exemplary calibration system 20 shown FIGS. 4A and 4B can be used with any of the calibration methods described herein, but it can also be used with other calibration methods not described herein.

Figure 5:
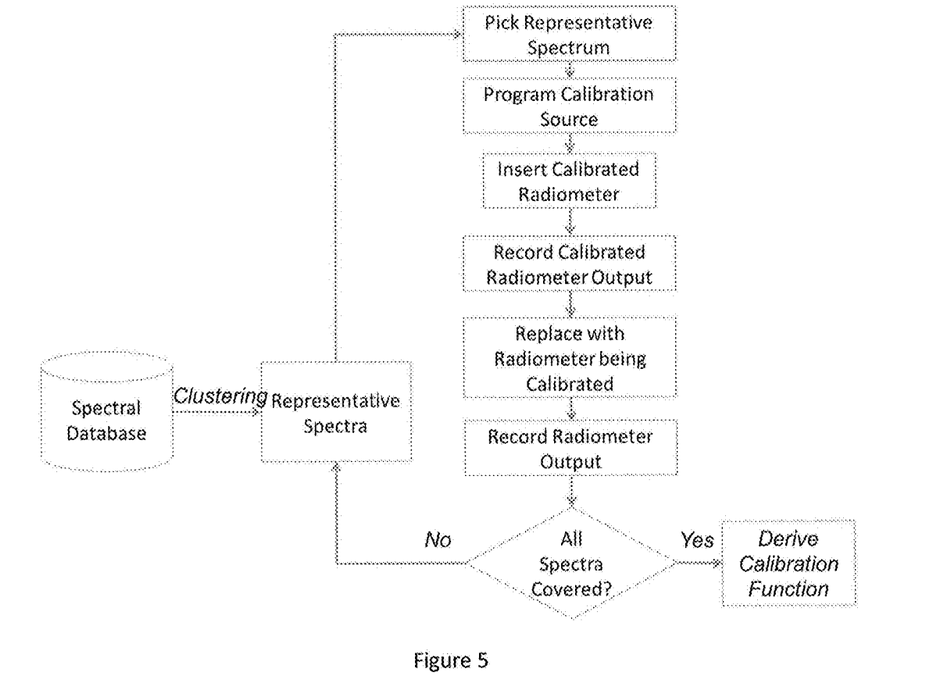
FIG. 5 illustrates an exemplary method of deriving or calculating a calibration function.

FIG. 5 illustrates an exemplary method of deriving or calculating a calibration function, wherein the calibration function can be used as part of a calibration process for a UV radiometer. Prior to the sequence of calibration steps, the method also shows and illustrates an aspect of this disclosure that clusters a plurality of spectral data to thereby create a plurality of representative spectra, as shown in FIG. 5. The derived a set of calibration spectra are intended to be representative of the spectra incurred in practice for the radiometer. The method of clustering spectral data and storing the clustered spectra data as the representative spectra is a stand-alone aspect in this disclosure, and is being shown in FIG. 5 for completeness of how it can be used in an overall method.

The sequence of steps in FIG. 5 uses the plurality of stored representative spectra. Any of the steps in FIG. 5 may be carried out by instructions stored on a memory device and executed by a processor. The method in FIG. 5 includes the use of a calibrated UV radiometer as a reference. There may be some differences between the expected and actual spectra due to drift in the LED intensities, hence the need to measure against a calibrated radiometer. FIG. 5 including picking one of the plurality of representative spectra from the plurality of representative spectra, as is shown. The calibration source (such as calibration source 15) in FIGS. 4A and 4B is programmed such that the emitted light from the plurality of light sources will mimic the representative spectrum that was picked. This involves individually driving each of the LEDs to approximate each representative spectrum. The already-calibrated radiometer is positioned in the calibration chamber, as shown in FIG. 5. The calibration source is then activated. The output from the calibrated radiometer is then recorded, as shown in FIG. 5. The calibrated radiometer is then replaced with the radiometer to be calibrated, as shown.

The calibration source is activated, and the output from the radiometer to be calibrated is recorded, as shown. The method then checks to determine if all of the plurality of representative spectra have been used to calibrate the radiometer. If not, the method then picks a different one of the representative spectra, and the process is repeated with that different representative spectrum. The method is repeated with all of the representative spectra. Then, the method includes deriving a calibration function from the set of inputs and outputs. The calibration function is related to the particular radiometer and the particular grouping of representative spectra.

In subsequent sections below, the disclosure describes aspects of some of the systems herein that pertain to the selection of the calibration spectra (representative spectra), the reproduction of such spectra using LEDs, and deriving the calibration function—along with mechanical features of the calibration system which ensure accuracy of the calibration measurements. The disclosure also includes inventive methods of storing the calibration information off-chip with easy retrieval via a mobile device during field usage.

Selection of calibration spectra. As shown in FIG. 5, prior to calibration, a plurality of spectra data was selected from a spectral database, and clustered to create the plurality of representative spectra used in the calibration process. The accuracy of a UV radiometer is highly dependent on its calibration. Typically, calibration is performed with a single source (or at most, two sources) upon manufacturing of the radiometer. In most cases, the spectrum of this single source is not representative of the different spectra encountered in practice (e.g., personal use), and hence the UV radiometer is likely to be inaccurate during field usage (see, Corrêa, M. D. P. et al. Comparison between UV index measurements performed by research-grade and consumer-products instruments. *Photochem. Photobiol. Sci.* 9, 459-463 (2010); and Xu, G. & Huang, X. Characterization and calibration of broadband ultraviolet radiometers. *Metrologia* 37, 235-242 (2003)). The exemplary systems described herein (e.g., FIGS. 4A and 4B) comprise a plurality of light sources (e.g., LEDs) with different center wavelengths, each of which is capable of being driven with a different current. This means the intensity of each LED can be individually controlled. The superposition of the LEDs defines the calibration spectrum (i.e., one of the representative spectra), which means the calibration spectrum can be modified (such as by programming) by controlling the intensity of the individual LEDs.

One aspect of the disclosure includes methods of picking the best, or desired, set of spectra from spectral data (e.g., from a database of spectral data), that are capable of mimicking real usage scenarios (e.g., personal daily use). We refer to this set of selected spectral data as the representative spectra, or a plurality of representative spectra. This disclosure includes an algorithm for deriving the representative spectra from a dataset of real usage spectra. Such a dataset may be publicly available data, or proprietary data in an existing database, e.g., the UVNet database (Environmental Protection Agency, U. Ultraviolet and Ozone Monitoring Program: UV-Net. (2008). at http://www.epa.gov/uvnet/), which contains spectral scan data from several spectrometers across USA over a period of several years. Alternatively, for example, the representative spectra may be derived by running one's own spectrometer scans over a period of time in different usage scenarios (e.g., different environment scenarios) such as in shade, or in sunlight through a window (it is to be noted that the UVNet database only has scans performed under open skies). This data is available in the form of $S_j = \{(w_{ij}, I_{ij}): i=1 \ldots M\}, j=1 \ldots N$, where $w_{ij}$ represents the $i^{th}$ scan wavelength for the $j^{th}$ scan, $I_{ij}$ represents the spectral irradiance for the same scan, M represents the total number of wavelengths scanned and N represents the total number of spectra in the database.

The UVNet database has in excess of 10,000 spectra. Replicating or mimicking all of these spectra during calibration would be impossible, and the calibration time for each device would be impractical. The challenge then is to find, or select, a set of K representative spectra (K<<M) $U_1$, $U_2$, ... $U_K$, that represents the various spectra encountered in practice (e.g., personal UV monitoring daily use). This may be mathematically formalized as:

Find $U_k$, $k \in (1, K)$ s. t.

$$\Sigma_{j=1}^{N} D(S_j, U_k) \text{ is minimum} \qquad \text{Eq. 4}$$

Here, $D(S_j, U_k)$ is a distance function which applies when the j-th spectrum $S_j$ is mapped to the k-th representative spectrum $U_k$, and is zero otherwise. A representative spectrum $(U_k)$ is of the same form $\{(w_{ik}, V_{ik}): i=1 \ldots M\}$ where $V_{ij}$ is the irradiance. In our method, we develop a distance function based on the spectral irradiance $(I_{ij})$.

$$D(S_j, U_k) = \sum_{i=1}^{M} (I_{ij} - V_{ik})^2, \text{ if } j \to k, \qquad \text{Eq. 5}$$
$$= 0, \text{ otherwise}$$

We solve this problem using a clustering algorithm such as k-means algorithm (see, J. A. Hartigan (1975). Clustering algorithms. John Wiley & Sons, Inc.; and Hartigan, J. A.; Wong, M. A. (1979). "Algorithm AS 136: A K-Means Clustering Algorithm". Journal of the Royal Statistical Society, Series C 28 (1): 100-108. JSTOR 2346830) to derive an optimal set of clusters. The centroid of each cluster gives us one representative spectrum. We determine the optimal number of clusters to derive (K) experimentally, by finding where the clustering error does not significantly reduce with further increase in K. The clustering methods herein are not, however, limited to use of this particular distance function, or the use of the k-means algorithm.

Figure 6:
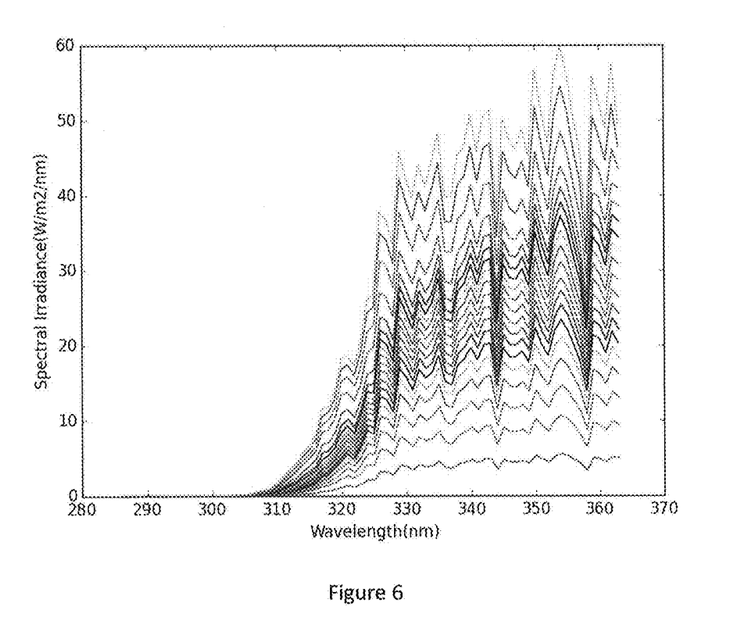
FIG. 6 illustrates an exemplary plurality of representative spectra.

FIG. 6 shows the result of clustering on the UVNet Database to produce 20 representative spectra, each of which is shown by a different line. Each of these represents a distinct time/location, and the combination of these provides adequate coverage of all UV spectra occurring in the USA over 5 years (199-2004). In the exemplary method in FIG. 5, the method would iterate through each of the 20 representative spectra, and for each of the selected calibration spectra, the calibration source would be controlled or programmed to mimic that particular representative spectrum. Other methods may derive more or less than 20 representative spectra.

Figure 7:
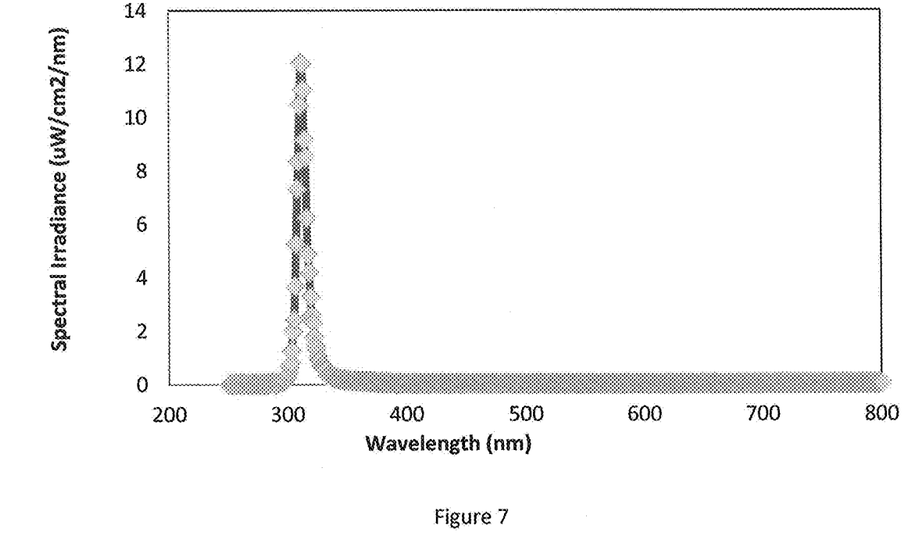
FIG. 7 illustrates spectral irradiance of an exemplary light source.

As shown in the exemplary FIG. 5, after a plurality of representative spectra have been created or established, each of the representative spectra are replicated or mimicked with a plurality of light sources (e.g., LEDs). A challenge is how to replicate or mimic each spectrum inside the calibration chamber, so that the radiometer output for each spectrum can be measured. In some embodiments this can be achieved with a set of LEDs, each of which has a pre-determined spectrum, such as shown in FIG. 7. FIG. 7 illustrates the spectral irradiance of a 310 nm LED. The LED typically has a peak at a center frequency (310 nm in the example in FIG. 7), with decaying tails. The disclosure below describes methods of combining LEDs in order to approximate or mimic a representative spectrum.

The spectrum of an LED, as seen at the surface of the radiometer, can be represented in the form of its spectral irradiance $I_l(\lambda)$, which represents the irradiance of the LED at each wavelength in the light spectrum (200<λ<1200). This spectral irradiance is usually available from the datasheet of the LED (with some translation to the plane of the radiometer), but can also be derived using a spectrometer. In the exemplary system in FIG. 4B, the LED can be turned on with a spectrometer inside the chamber. Each LED is driven by a current $i_l$, which determines the spectral irradiance. Typically, the spectral irradiance of an LED can be scaled up and down by controlling this current i.e.

$$I_l(\lambda) = I_l^{nom}(\lambda) \cdot \frac{i_l}{i_{nom}} \qquad \text{Eq. 6}$$

The final spectral irradiance at the surface of the radiometer is a super-position of the individual LED spectra $\Sigma_{l=1}^{L} I_l(\lambda)$, where L represents the total number of LEDs used in the calibration source. We need this combination to be as close as possible to a representative spectrum $I_{rep}(\lambda)$ as possible. This is what is referred to herein as "mimicking" the representative spectrum.

With this knowledge, methods herein can formulate the determination of the LED currents ($i_l$) to approximate a given representative spectrum, as an optimization problem:

$$i_l = \operatorname{argmin}_{i_l} \left\| \sum_{l=1}^{L} I_l^{nom}(\lambda) \cdot \frac{i_l}{i_{nom}} - I_{rep}(\lambda) \right\| \qquad \text{Eq. 7}$$
$$\text{s.t.} : 0 < i_l < i_{l,max}, \forall l$$

where, $\| \|$ represents the Euclidean norm (https://en.wikipedia.org/wiki/Norm (mathematics)#Euclidean_norm) and $i_{l,max}$ represents the maximum current rating for the given LED. The objective function and constraints of this problem are both convex in nature, and so this can be efficiently solved by a standard optimization package (e.g., Matlab, R) to find the set of diode currents $i_l$, which lead to the best approximation or mimicking of the representative spectrum.

Figure 8:
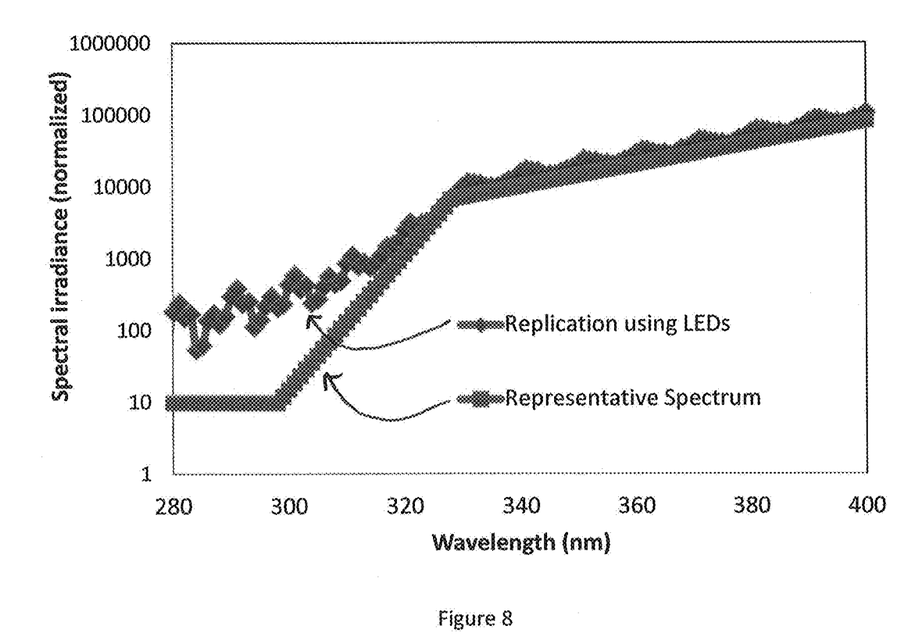
FIG. 8 illustrates a comparison between a representative spectrum and a replicated, or mimicked, spectrum.

FIG. 8 illustrates an exemplary representative spectrum and an exemplary corresponding replication (mimic) of that representative spectrum using light-emitting diodes centered at different frequencies.

Separating calibration based on location and time. The final step in the exemplary calibration process in FIG. 5 is the derivation of the calibration function. As mentioned in Equation 4, the calibration function can be derived by a least squares minimization of the error between the radiometer observed (measured) output and the actual value, as obtained from the spectrum of the source.

Typically, all radiometers have a single calibration function, which is used during its operational lifetime, until it is re-calibrated. This function is derived using a single source, which usually is an off-the-shelf calibrated lamp which does not match the solar spectrum (see, Correa, M. D. P. et al. Comparison between UV index measurements performed by research-grade and consumer-products instruments. *Photochem. Photobiol. Sci.* 9, 459-463 (2010); and Xu, G. & Huang, X. Characterization and calibration of broadband ultraviolet radiometers *Metrologia* 37, 235-242 (2003)). Re-calibration is typically performed by shipping the radiometer back to the manufacturer. As mentioned before, a single calibration function, calibrated to a single light source, which looks unlike the solar spectrum, will be inaccurate when measuring in a wide variety of scenarios in practice (e.g., personal daily use). Additionally, personal UV sensors measures UV from solar radiation. The solar spectrum varies greatly based on location (latitude/longitude/altitude) and time (hour of day, and day of year). Calibrating to a single source and having a single calibration function does not afford accuracy over the wide variety of solar conditions encountered in practice.

Figure 9:
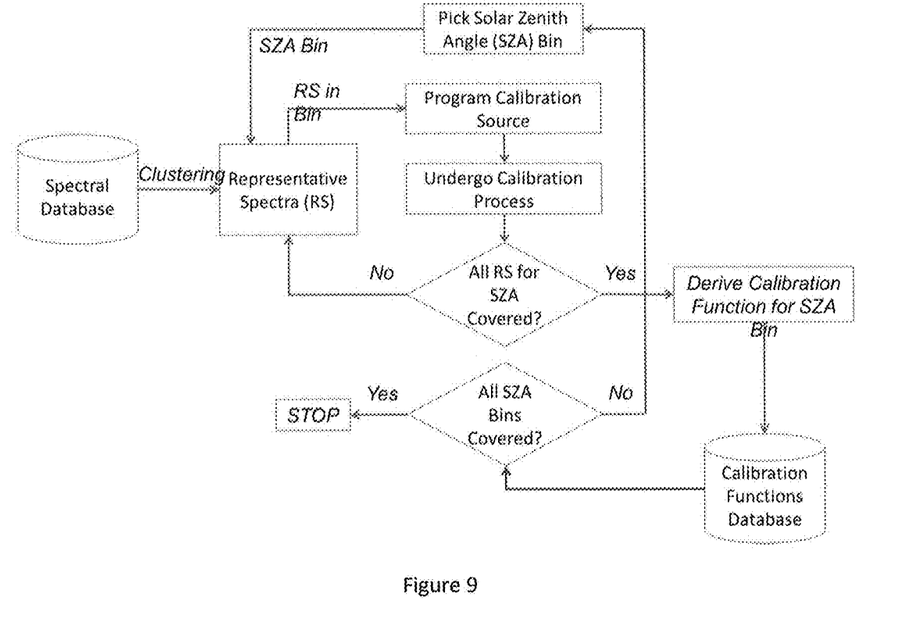
FIG. 9 illustrates an exemplary method of deriving a plurality of calibration functions.

To address these problems with accuracy, one aspect of this disclosure includes deriving multiple calibration functions based on binning of location and time. FIG. 9 illustrates an exemplary method of deriving a plurality of calibration functions. The multiple calibration functions can be derived at calibration time for the device (usually at the manufacturing stage). During calibration, the method includes picking a bin for the solar zenith angle, wherein the bin is a range of solar zenith angles where it is expected that representative spectra will be similar. This bin is then used to query the database of representative spectra, to derive some representative spectra that correspond to a solar zenith angle within the bin. The method then utilizes these representative spectra to repeatedly program the calibration source and run the calibration steps as set forth in FIG. 5. The method also includes deriving a calibration function specific to the solar zenith angle bin. This process is repeated for a variety of solar zenith angle bins so that a calibration function can be derived is derived for each solar zenith angle bin, as shown in FIG. 9.

When the radiometer is in use (e.g., as a personal UV sensor), the combination of latitude/longitude and time can be combined to derive the solar zenith angle (SZA) (see https://en.wikipedia.org/wiki/Solar_zenith_angle). An aspect of the disclosure relates to systems and methods that are capable of determining the location and time in real-time due to, for example, its use of a smartphone that has a GPS chip and a clock. The derived SZA can then be utilized to look up the appropriate calibration function that was derived during the calibration process, wherever that calibration function is being stored.

Storage and retrieval of calibration information. One aspect of the disclosure is storage (e.g., cloud based) and retrieval of calibration information, such as one of a plurality of calibration functions. Traditionally, a calibration function is stored on the radiometer on some form of persistent storage, such as flash memory. This works well for the single calibration case, where only one set of parameters needs to be stored. But when multiple calibration functions need to be stored on the same persistent memory, it can lead to a shortage of storage space. In particular, on-chip flash memory is limited and radiometers try to use as little of it as possible.

One aspect of this disclosure includes methods for storing and retrieving calibration information without using the radiometer memory. It is recognized that cheaper and larger storage is available on the cloud, and smartphones are usually connected to the internet, which affords them access to the cloud. Multiple calibration functions derived at manufacturing time can be stored in the cloud. Methods herein can derive multiple calibration functions not only for multiple locations, but also for different device ages, since the electronic components of a radiometer change their properties with age. The processes herein can thus be used to derive multiple calibration functions based on the age of the device.

Figure 10:
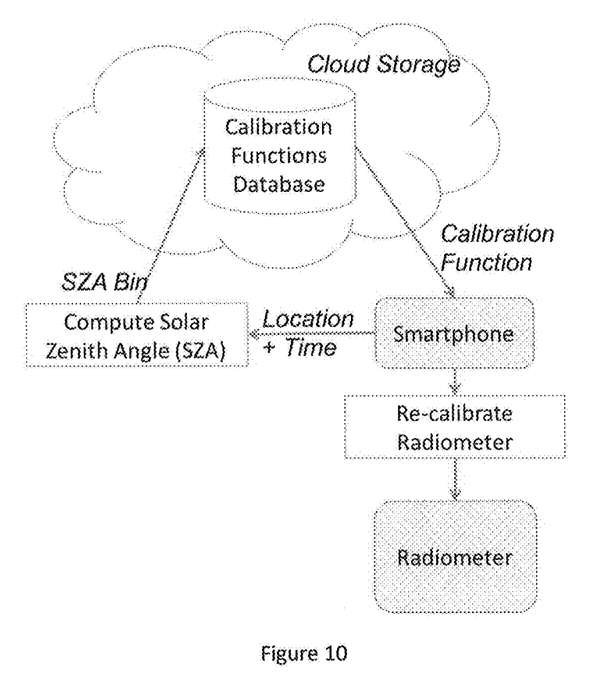
FIG. 10 illustrate an exemplary system and methods of retrieving a calibration function for a radiometer.

FIG. 10 illustrates an exemplary method of re-calibrating a radiometer depending on location and time detected by the hand-held device (e.g., a smartphone). The retrieval of the calibration information is shown in FIG. 10. The internet-connected device (e.g., smartphone) determines the solar zenith angle (SZA) bin based on the location. It then uses this SZA bin to query a cloud-based database as shown to retrieve the appropriate calibration function. This retrieval is done over an internet connection, either using wired (Ethernet) or wireless (WiFi/LTE) technologies. The calibration function is then written to the radiometer either over the wire (e.g. over a USB cable), or over the air (e.g. using Bluetooth or Bluetooth Low Energy). A similar flow can be envisioned for retrieving a device-aging based calibration function.

The disclosure herein also includes systems and methods of minimizing internal reflection in a calibration system. An example is to include UV absorbing material to minimize internal reflection. During calibration, some methods herein control the source LEDs to mimic a particular representative spectrum. If there are reflections of UV light inside the calibration chamber, the spectrum at the device can potentially look very different from the representative spectrum. This is undesirable because it is desired to calibrate the radiometer using exactly the representative spectra. In order to overcome reflection of light inside the calibration chamber, all inner surfaces of the calibration chamber are coated with a UV absorbing material. For example, in the exemplary embodiment in FIGS. 4A and 4B, the inner surfaces of lid 12, body 14, base 16, holder 13, and support 19 can be coated with a UV absorbing material. In some embodiments the material can either be in the form of a thin-film coating (see Zayat, Marcos, Garcia-Parejo, Pilar, Levy, David, "Preventing UV-light damage of light sensitive materials using a highly protective UV-absorbing coating", Chem. Soc. Rev., 2007), or UV absorbing paints/dyes such as blackboard paint (see http://www.gerdneumann.net/english/instrument-building-parts-teile-fuer-den-fernrohrbau/totmatte-schwarze-optikfarbe-deep-black-optical-paint.html).

An aspect of this disclosure is related to stabilizing a radiometer relative to a calibration source. Stabilizing as used herein includes stabilizing in at least one type of motion, such as (without limitation) roll and pitch. During calibration, it is essential to ensure that each device is oriented in the same way in all three dimensions (x, y, z), relative to the calibration source. Otherwise the spectrum received at the radiometer will not be the same as what was intended, and this will lead to errors during calibration. This disclosure includes two different methods for fixing orientation, one of which makes roll and pitch negligible, and the other makes yaw relative to the calibration source also negligible. The first exemplary method is a magnetic stabilizing method. A wearable device shown in FIG. 2 and described in US20170115162A1 can utilize a magnetic attachment method in order to be worn on the upper torso at all times, as is described in more detail in US20170115162A1. The radiometer can include an internal annular magnet that attaches to an external holding magnet which is worn under clothing. The internal ring magnet of the radiometer can be utilized during calibration to stabilize the radiometer in the calibration chamber. In some embodiments the calibration chamber includes a ring of magnetic material under the radiometer holder. The ring of magnetic material can be a ring magnet of opposite polarity, or even a piece of ferromagnetic material. The surface of the holder is flat, which can be verified with a spirit level. The magnetic attraction causes the radiometer to be firmly fixed on the surface of the holder, so that its roll and pitch cannot be altered during the calibration operation.

An alternative method of stabilizing the radiometer can utilize an external surface of the radiometer, and as one example uses a USB port on a radiographer. Devices shown and described in US20170115162A1 can include a micro-USB charging port on the non-measuring side. The calibration system can include a component shaped to mate with the radiometer component. For example, the calibration system can include a micro-USB cable head which is fixed exactly perpendicularly on the radiometer holder portion of the calibration station, which when interfaced with the USB port on the radiometer, ensures the radiometer is always inserted into the calibration chamber in the same orientation. This method and technique can accompany a screw-hole based fixing, or can replace it.

What is claimed is:

1. A method of calibrating a UV sensing device, comprising:
    emitting light from a calibration source at a UV sensing device, the calibration source adapted to mimic a representative spectrum, wherein the representative spectrum comprises information representing the intensity of light at a plurality of wavelengths, the representative spectrum based on a historical time and a location, wherein the historical time is prior to the initiation of the method of calibrating the UV sensing device; and
    recording an output from the UV sensing device in response to the emitted calibration light.

2. The method of claim 1, further comprising calculating a calibration function for the UV sensing device based on the recorded output from the UV sensing device, and storing the calibration function in a memory.

3. The method of claim 2, further comprising:
    emitting second calibration light at the UV sensing device, the second calibration light adapted to mimic a second representative spectrum different than the first representative spectrum, the second representative spectrum based on at least one of a second historical time and a second location, wherein the second historical time is prior to the initiation of the method of calibrating the UV sensing device;
    recording a second output from the UV sensing device in response to emitting the second calibration light; and
    calculating a second calibration function for the UV sensing device based on the second recorded output from the UV sensing device, and storing the second calibration function in the memory.

4. The method of claim 1, further comprising:
    emitting second calibration light at the UV sensing device, the second calibration light adapted to mimic a second representative spectrum different than the first representative spectrum, the second representative spectrum based on at least one of a second historical time and a second location, wherein the second historical time is prior to the initiation of the method of calibrating the UV sensing device; and
    recording a second output from the UV sensing device in response to the emitted second calibration light.

5. The method of claim 4, further comprising calculating a calibration function for the UV sensing device based on the output and the second output from the UV sensing device, and storing the calibration function in a memory.

6. The method of claim 5, wherein the representative spectrum and the second representative spectrum are grouped in executable instructions, wherein the grouping is based on at least one of solar zenith angle, a time and a location of the respective representative spectrum, and the calibration function is stored in memory such that a relationship exists in the memory between the calibration function and the grouping.

7. The method of claim 1, wherein emitting calibration light that is adapted to mimic a representative spectrum comprises emitting light from a plurality of light sources, each of the light sources having a different center wavelength, and individually controlling the intensity of at least one of the plurality of light sources.

8. The method of claim 7, wherein individually controlling the intensity of at least one of the plurality of light sources comprises varying current that is being delivered to the at least one of the plurality of light sources, and wherein the superposition of the intensities of light from the plurality of light sources mimics the representative spectrum.

* * * * *